United States Patent
Sauvée et al.

[11] Patent Number: 4,699,253
[45] Date of Patent: Oct. 13, 1987

[54] BRAKE ACTUATOR WITH AUTOMATIC ADJUSTMENT

[75] Inventors: Jean Paul Sauvée, Aubervilliers; Pierre Pressaco, La Courneuve, both of France

[73] Assignee: Societe Anonyme D.B.A., Paris, France

[21] Appl. No.: 15,494

[22] Filed: Feb. 5, 1987

Related U.S. Application Data

[63] Continuation of Ser. No. 692,140, Jan. 17, 1985, abandoned.

[30] Foreign Application Priority Data

Jan. 31, 1984 [FR] France .................. 84 01438

[51] Int. Cl.$^4$ ............................... F16D 65/56
[52] U.S. Cl. ......................... 188/71.9; 188/196 D; 188/79.5 K
[58] Field of Search ............ 188/71.9, 79.5 K, 196 M, 188/196 D

[56] References Cited

U.S. PATENT DOCUMENTS

| | | | |
|---|---|---|---|
| 3,277,984 | 10/1966 | Larsson | 188/196 D |
| 3,967,705 | 7/1976 | Johannesen et al. | 188/71.9 |
| 3,995,722 | 12/1976 | Jones et al. | 188/196 D |
| 4,056,173 | 11/1977 | Farr | 188/71.9 |
| 4,394,890 | 7/1983 | Kleinhagen, Jr. | 188/71.9 |
| 4,399,894 | 8/1983 | Tribe | 188/71.9 |

FOREIGN PATENT DOCUMENTS

| | | |
|---|---|---|
| 1317919 | 1/1963 | France . |
| 2119759 | 8/1972 | France . |
| 2434310 | 3/1980 | France . |

Primary Examiner—George E. A. Halvosa
Assistant Examiner—Matthew C. Graham
Attorney, Agent, or Firm—Larry J. Palguta; Ken C. Decker

[57] ABSTRACT

The invention concerns a brake actuator with automatic adjustment, of the type incorporating a screw and nut system with reversible pitch (46, 48) situated between a working piston (40) and a control component (34), the screw and nut system transmitting a force between the control component (34) and the working piston (40) when relative rotation between the screw and the nut is locked by a locking device (50-54). The brake actuator incorporates an automatic relative axial positioning device (56) between the control component (34) and the working piston (40) providing a predetermined approach travel between the working piston (40) and a friction component (42) capable of being pushed by the brake actuator.

4 Claims, 5 Drawing Figures

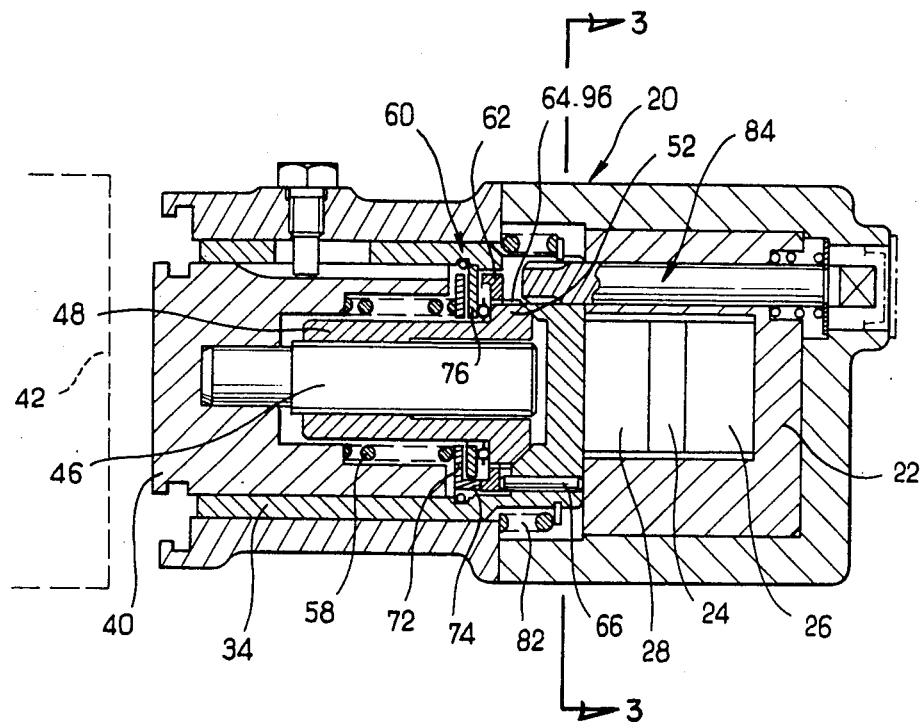
FIG_2
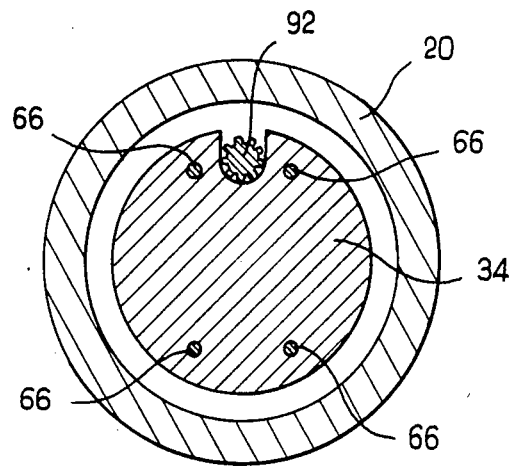
FIG_3

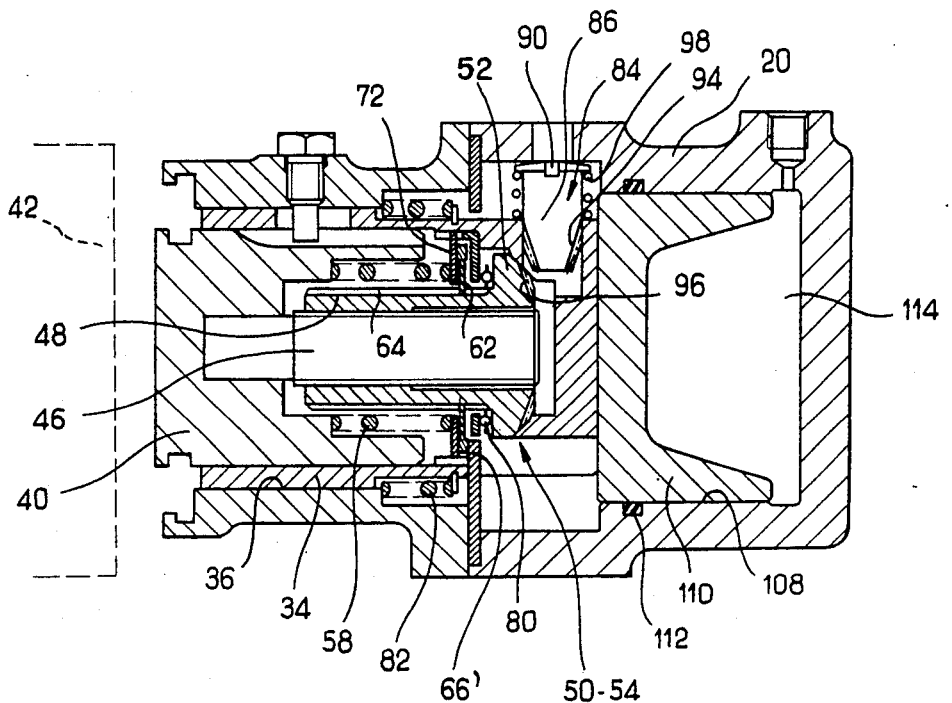
FIG_4
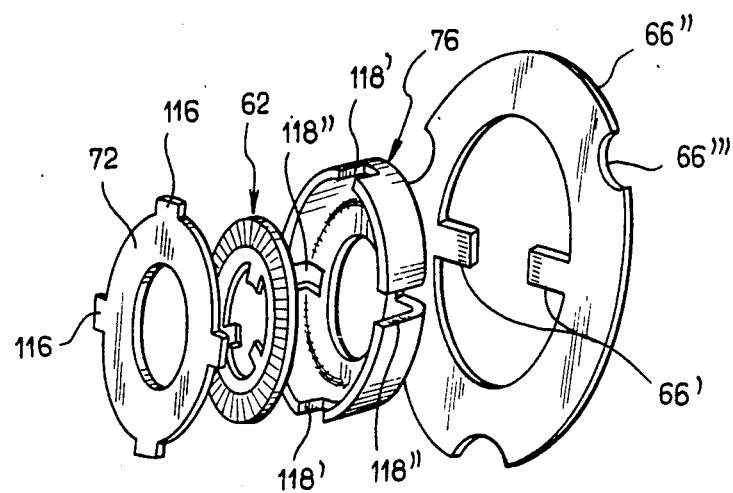
FIG_5

BRAKE ACTUATOR WITH AUTOMATIC ADJUSTMENT

This is a continuation of abandoned application Ser. No. 692,140 filed Jan. 17, 1985.

The invention concerns a brake actuator capable of operating a brake, intended particularly for equipping a motor vehicle.

The invention particularly concerns a brake actuator with automatic adjustment intended to compensate automatically for the wear of the friction linings in order to maintain the travel of the mechanical control and/or of the brake pedal at an essentially constant small value.

A number of brake actuators equipped with automatic adjustment devices are known, for example that described in French Pat. No. 1,317,919. The brake actuator with automatic adjustment described in the document incorporates a screw and nut system with reversible pitch, the nut being free to turn so as to follow the movements of the piston, the nut being locked for the return movement owing to a frictional spring clutch positoned between the piston and the nut. This arrangement allows an axial force to be transmitted between a control component and the working piston through this locking device formed by the spring clutch. It will be noted that the automatic adjustment is brought into operation when the working piston is pushed hydraulically, the automatic adjustment being out of action during mechanical actuation, because in this case the screw and the nut move simultaneously and cannot bring the automatic adjustment into operation. Produced in quantities of millions, the device gives full satisfaction and is very reliable. Howver, the automatic adjustment is brought into operation by the relative movement of the working piston and of the screw with reversible pitch, that is to say that if the clearance between the piston and the friction components is large, the pedal may require to be actuated several times, the master cylinder of the vehicle being incapable of supplying to the brake actuator the whole volume of fluid necessary to displace the piston from a fully retracted position to a second position for working in co-operation with the friction components. This phenomenon is well known, and whether or not the brake is equipped with automatic adjustment, it is always necessary after changing the friction components to "pump" by means of the brake pedal until the pedal regains its correct "feel". It will also be noted that if the foregoing precaution is not taken, the mechanical control may be inoperative through insufficient travel, for example, of the lever.

The invention proposes a brake actuator with automatic adjustment, of simple and reliable construction, with or without hydraulic control, which does not incorporate the disadvantages mentioned above.

With this aim, the invention proposes a brake actuator with automatic adjustment, of the type incorporating a screw and nut system with reversible pitch situated between a working piston and a control component and capable of transmitting an axial force from the control component to the said working piston when relative rotation between the screw and the nut, of the screw and nut system, is locked by a locking device, characterized in that the brake actuator incorporates an automatic relative axial positioning device between the control component and the working piston, providing a predetermined approach travel between the working piston and a friction component capable of being pushed by the brake actuator.

It is apparent that, owing to these characteristics, irrespective of the approach travel between the working piston and the friction components, the automatic relative axial positioning device allows the clearance between the working piston and the friction component to be recovered without the need for "pumping", and the mechanical control is immediately operative irrespective of the initial distance between the working piston and the friction component to be pushed.

Three embodiments of the invention are described below, by way of examples which are not limiting, with reference to the accompanying drawings, in which:

FIG. 2 is a view, similar to that shown in FIG. 1, of a second embodiment;

FIG. 3 is a view of the brake actuators shown in FIGS. 1 and 2, sectioned along the lines 3—3 shown in these Figures;

FIG. 4 is a partial sectioned view of a third embodiment with hydraulic control; and FIG. 5 is an enlarged exploded view in perspective of components of the third embodiment.

Figure 1:
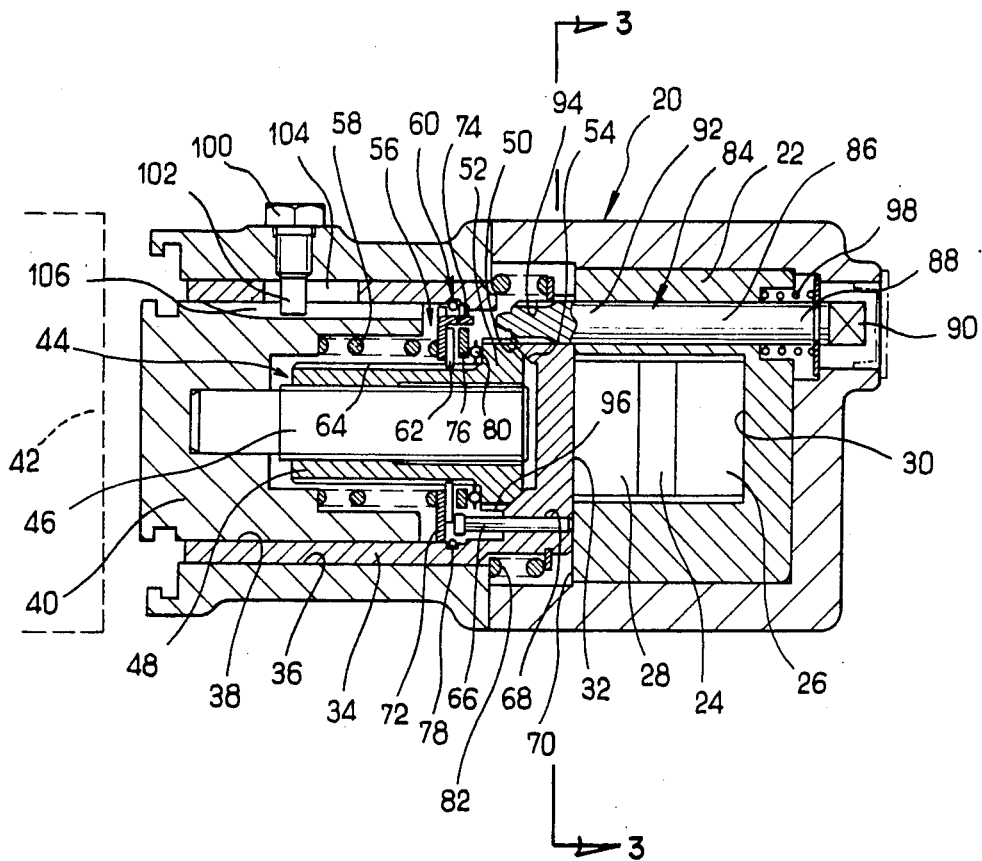
FIG. 1 is a partial sectioned view of a brake actuator constructed in accordance with the invention.

The brake actuator shown in FIG. 1 is of the type controlled by a wedge, used particularly in disc brakes for heavy vehicles. This brake actuator incorporates, in a conventional manner, a body 20 in which a guide component 22 is mounted, so as to be fixed relative to the body 20, and which houses a wedge 24 and two rollers 26 and 28 positioned on each side of the wedge 24. The roller 26 is capable of co-operating with the bottom 30 of a slot formed in the component 22. In a similar way the roller 28 is capable of co-operating with the bottom 32 of a control component 34 mounted so as to slide in a bore 36 formed in the body 20. A bore 38 is formed in the control component 34, in which a working piston 40 is mounted so as to slide, the latter being capable of co-operating with a friction component 42 which is represented by dotted lines. An automatic adjustment device, designated as an assembly by the reference 44, is situated between the piston 40 and the control component 34. More precisely, a screw 46 with reversible pitch is fixed in the piston 44 and carries a nut 48, which also has a reversible pitch, which co-operates, through a conical portion 50 formed on an enlarged portion 52 of the nut 48, with a conical portion of complementary shape 54 formed at the bottom of the bore 38 of the control component 34. The friction of one cone upon another of portions 50 and 54 forms a device for locking the rotation of the nut 48.

In accordance with the invention, the brake actuator incorporates an automatic relative axial positioning device between the control component and the working piston, designated as an assembly by the reference 56. This positioning device 56 incorporates, firstly, internal means 58 capable of moving the piston 40 to the left, referring to FIG. 1, formed in the embodiment shown by a first spring mounted in a stressed condition, and secondly, a second locking device designated as an assembly by the reference 60. This second locking device 60 incorporates a friction ring 62 mounted so as to slide upon straight grooves 64 formed on the outside diameter of the nut 48, the friction ring 62 having fingers which enter the grooves 64 in such a way that the friction ring is fixed in rotation relative to the nut 48.

The second locking device also incorporates two components situated on each side of the friction ring 62, a first component 66 formed by a rod mounted in a hole 68 formed at the bottom of the control component 34, as may be seen in FIG. 1, the component 66 having a length such that it co-operates, firstly, with the friction ring 62, and secondly, with a portion which is fixed relative to the body 20, and more precisely with a front wall 70 of the guiding component 22, the component 66 being capable of sliding in the hole 68. The control component 34 also carries the other of the two components formed by a sliding ring 72, immobilized in rotation relative to the control component 34 by means of folded fingers 74 entering openings formed in a washer 76 which is fixed relative to the control component 34 owing to a ring 78 which is positioned in a groove in the control component 34. The ring 78 is positioned in such a way that when the brake is at rest, as shown in FIG. 1, a slight clearance exists between the component 72 and the ring 78, thus defining the predetermined initial travel, the ring 78 forming a fixed abutment for the other component 72 when the brake is operated. The enlarged portion 52 of the nut 48 is capable of co-operating with the fixed abutment 78 through the ring 76 by means of a ball thrust race 80 forming an axial bearing. A second spring 82, situated between the body 20 and a ring firmly fixed to the control component 34, pushes the component 34 to the right, referring again to FIG. 1, so as to bear against the front wall 70 which is fixed relative to the actuator body 20. The brake actuator also incorporates a device for resetting the automatic adjustment to zero, designated as an assembly by the reference 84 and formed in the embodiment shown by a rod 86, incorporating a first end 88 on which is formed a driving head 90, and incorporating at its other end 92 a set of teeth 94 capable of co-operating with a set of teeth 96 formed on the periphery of the enlarged portion 52 of the nut 48. A return spring 98 for the rod is situated between the guiding component 22 and a collar carried on the rod 86, so as to disengage the two sets of teeth from one another when the driving head 90 is not pushed to the left, again referring to FIG. 1.

A screw 100 mounted in the body 20 carries a projection 102 which passes through a slot 104, formed in the control component 34, and enters a groove 106 formed in the working piston 40, thus preventing any rotational movement, relative to the body 20, of the piston and of the control component, but allowing movement in translation in the axial direction.

Referring to FIG. 3, it is seen that four components 66 are provided so as to push the friction ring 62 at several points on its periphery, and to avoid this ring becoming skewed. The components 66 are spaced in the vertical direction, shown in FIG. 3, so as to pass each side of the roller 28 and be able to come into contact with the guiding component 22.

The brake described above with the aid of FIGS. 1 and 3 operates in the following manner:

At rest, the various components occupy the positions shown in FIG. 1. When The brake actuator is actuated, that is to say when the wedge 24 is inserted between the rollers 26 and 28, the latter separate by pushing the control component 34 to the left, referring to FIG. 1, against the spring 82. During this first movement, the spring 58 keeps the components 66 bearing against the component 22, through the component 72 and the friction ring 62. As the friction ring 62 is still clamped between the two components 72 and 66 it cannot turn, and prevents the nut 48 from turning, the nut bearing, by its conical portion 50, against the conical portion 54 of the control component 34. If the movement of the control component 34 to the left is so slight that the component 72 does not come to bear against the ring 78 forming a fixed abutment, on releasing the brake the components return to their initial positions without having moved. When the movement of the control component 34 to the left is such that the component 72 comes to bear against the ring 78, the force of the spring 58 is no longer applied to the friction ring 62, and the latter is therefore no longer clamped between the two components 72 and 66, and in this case the spring 58, pushing the working piston 40 to the left, pushes the screw 46 and the nut 48 to the left. By pulling the nut 48 to the left, the latter firstly becomes disengaged from the conical surface 54 of the control component 34, and secondly it comes to bear against the fixed abutment 76, 78 through the ball thrust race 80, and as the friction ring is free to turn relative to the two components 72 and 66, the spring 58 draws the piston 40 to the left by unscrewing the nut 48 by means of the thread with reversible pitch. Nothing opposes the movement of the piston 40 to the left under the effect of the spring 58 and the nut 48 which unscrews until the pad 42 stops the piston 40 after a travel of a greater or lesser amount according to the distance from the position where the friction component 42 was situated. Any additional advance of the wedge 24 between the rollers 26 and 28, that is to say any advance of the control component 34 to the left, causes the conical portions 50 and 54 to come into contact, the nut 48 then becoming locked in rotation by the friction between these two conical portions. The application of the brake can then be carried out with a small travel of the wedge 24, all clearance having been recovered by displacement of the piston 40. On releasing the brake during a first stage, while a force exists between the two conical portions the nut cannot turn, and therefore no adjustment can take place; if, during a second stage, this force ceases when the component 66 is not yet bearing against the wall 70 and the washer 72 is still bearing against the fixed abutment 78, the positioning device can again come into operation to provide an adjustment corresponding, for example, to the wear of the friction components due to the previous brake application. During a third stage, the component 66, coming into contact with the wall 70, ensures that the friction ring 62 is clamped between the two components 72 and 66 and all rotation of the nut 48 is prevented. Finally, during the fourth stage, the spring 82 returns the control component 34, and the component 72 regains its clearance from the fixed abutment 78, the clearance corresponding to the predetermined approach travel, or as already shown, to the predetermined initial travel because, as shown above, these two travel distances are identical, and correspond to the predetermined clearance between the component 72 and the fixed abutment 78.

It is seen, then, that the piston 40, owing to the automatic positioning device, spontaneously recovers all the clearance existing between the piston and the friction components without requiring a large travel at the wedge or at the control component 34, irrespective of the relative positions of the piston 40, the control component 34 and the friction component 42.

FIG. 2 shows a second embodiment, in which the same components fulfilling the same functions carry the same reference numbers.

This embodiment only differs from the previous case by a variant of the arrangement of the second locking device, and this device alone is described below; for the remainder of the description, reference should be made to the description of the first embodiment.

In this second embodiment, the friction ring 62 is carried by the set of teeth formed on the enlarged portion 52 of the nut 48. These teeth fulfil the function of the straight grooves 64 of the first embodiment, and also provide the function of the set of teeth 96 of the first embodiment, intended for the device for resetting to zero 84. The friction ring 62 is free to slide axially on these teeth 64-96 and is situated between the two components 66, 72, that is to say, the rod 66 capable of sliding in the control component 34, and the other component 72 whose folded fingers 74 serve, firstly, for the immobilization in rotation of the other component 72 relative to the control component 34 by co-operation with openings formed in the washer 76, these fingers 74 also co-operating with the friction ring 62 so as to immobilize the latter in rotation as described for the first embodiment. In the same way, the axial clearance between the other component 72 and the fixed abutment washes 76 defines the predetermined initial travel in a similar manner to that of the first embodiment.

As regards the operation of the second embodiment, refer to the description of the first embodiment.

It will be noted, however, that in this embodiment the manufacture of the nut 48 is considerably simplified; a single set of teeth on the enlarged portion 52 of the nut 48 provides the functions of the longitudinal grooves 64 and of the former set of teeth 96.

FIGS. 4 and 5 show a third embodiment which is a variant of the brake actuator according to the invention, in which the control of the brake actuator, instead of being achieved by means of a wedge and rollers, is achieved by means of a purely hydraulic control.

In the same way as for the two previous embodiments, the same components fulfilling the same functions carry the same reference numbers.

The brake actuator incorporates a body 20 in which a bore 108 is formed which houses a hydraulic piston 110 mounted so as to be sealed in the bore 108 by means of a conventional seal 112. The bottom of the body 20, the bore 108 and the piston 110, define a chamber 114 capable of being joined to a source of hydraulic pressure (not shown), such as, for example, the master cylinder of the vehicle. As in the previous embodiments, the body 20 also houses a control component 34 capable of sliding in a bore 36 formed in the body 20. The control component houses a working piston 40 which carries, in a similar manner, a screw with reversible pitch 46 on which is mounted a nut 48, also with reversible pitch. The nut 48 incorporates longitudinal straight grooves 64, on which a friction ring 62 can slide but is firmly fixed in rotation to the nut. In a manner similar to that of the previous embodiment, the friction disc can be locked between two components, a first component 66' formed by two fingers firmly fixed to a ring 66", itself immobilized relative to the body 20 by means of slots 66''', as shown in FIG. 5, and another component 72 pushed into frictional engagement with the friction ring 62 by a spring 58. The other component 72 is immobilized in rotation relative to the control component 34, owing to fingers 116 entering into slots 118 formed in an abutment component 76 firmly fixed to the control component 34. It will be noted that the abutment component 76 incorporates four slots 118, two of which are shallow 118', the bottom of these slots 118' defining, with the fingers 116 of the component 72, the predetermined approach travel, as described for the previous embodiments. In addition, the component 76 incorporates two other deep slots 118" which extend onto the disc face of the component 76 so as to allow the two fingers 66' to pass, enabling the latter to co-operate with the friction ring 62. It will be noted that in this embodiment, the friction ring 62 and the two components 72 and 66' incorporate sets of teeth, providing a large amount of friction between the components. In the same way as in the previous embodiments, the enlarged portion 52 of the nut 48 has conical portions co-operating with conical portions formed on the bottom of the control component 34 to form the first locking device 50, 54.

It will be noted that this embodiment also incorporates a device for resetting to zero 84; it is, however, mounted so as to be perpendicular to the axis of the brake actuator and also has a rod 86 provided at one of its ends with a driving head 90 formed by a screwdriver slot, and at its other end with a set of teeth 94 capable of co-operating with a set of teeth 96 when the rod 86 is pushed by the screwdriver against the spring 98 which normally keeps the two sets of teeth apart from one another in the absence of pressure on the rod 86.

The operation of this third embodiment is similar to that of the two previous embodiments with, however, the following differences:

Referring to FIG. 4, when fluid under pressure is admitted into the chamber 114 the piston 110 moves to the left, moving the control component 34 also to the left in FIG. 4. When the amplitude of the movement to the left exceeds the clearance existing between the fingers 116 and the bottom of the slots 118', the component 76 also moves away the other component 72 towards the left by means of the bottom of these slots 118', thus releasing the friction existing between the friction ring 62, the other component 72 and the fingers 66' of the fixed ring 66" which is immobilized relative to the body. The operation is then the same as that previously described, that is to say the piston 40 is moved to the left by the spring 58, given that the screw 46 exerts a tension on the nut 48 which is no longer locked by the friction ring 62, and the nut can therefore turn owing to the thread with reversible pitch, the enlarged portion 52 bearing against the component 76 through the axial thrust bearing 80, the tension exerted by the piston 40 upon the nut 48 having disengaged the friction of one cone against another 50-54. The remainder of the operation is similar to that previously described, although the rods 66 are replaced by the fingers 66' of the ring 66", the ring 66" thus fulfilling simultaneously both the function of the rods 66 and the function of the front wall 70 carried by the component 22 of the first embodiment.

In an embodiment which is not illustrated, this brake actuator is of twin construction with a working piston on each side of the brake actuator, and it is then possible to use the invention in a drum brake for actuating two shoes. It will be evident to a person versed in the art that in this case the spring 58, which moves the working piston 40 to recover the clearance, must have a force greater than the force of the return spring of the shoes, situated between the latter to cause the shoes to return to their initial rest position after completion of the braking application.

It will also be understood that it is possible to construct a brake actuator incorporating simultaneously a hydraulic control of the type of the third embodiment, and a mechanical control of the type used in the first two embodiments, providing that the interface between the piston 110 and the control component 34 is suitably arranged so as to interpose the mechanical control in a region not incorporating any hydraulic pressure.

It is evident that the invention is not limited to the embodiments described and that modifications within the scope of a person versed in the art can be carried out without departing from the framework of the present invention; in particular, the shape of the friction rings and the locking components may be changed or modified, and similarly for the mechanism for resetting to zero which could be subjected to any conventional modification.

We claim:

1. A brake actuator with automatic adjustment of the type incorporating a screw and nut system with reversible pitch situated between a working piston and a control component in a body and capable of transmitting an axial force from said control component to said working piston when relative rotation between the screw and nut of the screw and nut system is locked by a first locking device, an automatic relative axial positioning device between said control component and working piston so that after a predetermined initial travel of said control component the positioning device is operated by internal means displacing axially said working piston relative to said control component when the internal means renders inoperative said first locking device, characterized in that the positioning device includes a second locking device for preventing the positioning device from operating whenever travel of the control component is less than said predetermined initial travel, said internal means comprising a first spring cooperating axially with said working piston and operatively with said control component, the second locking device including a friction ring joined in rotation with the screw and nut system and preventing relative rotation between the screw and the nut when the friction ring is clamped between fixed and sliding rings which are rotatably fixed, the fixed ring mounted fixedly relative to the body and having fingers whose engagement with said friction ring ceases when travel of said control component has exceeded the predetermined initial travel so that said second locking device is rendered inoperative, and the sliding ring having first and second sets of fingers being pushed axially be said first spring into engagement with said friction ring and the first set of fingers of the sliding ring pushed toward abutments of an abutment component which is fixed relative to said control component, the abutment component having an orthogonal cross section and a first and a second pair of slots therein, the first pair of slots allowing the set of fingers of said fixed ring to pass through the abutment component and the second pair of slots providing the abutments for engagement with the first set of fingers of the sliding ring, axial displacement of said sliding ring relative to the control component being halted by engagement with, depending on positioning of said control component, one of the friction ring and the abutments, and the first locking device comprising the nut having an enlarged portion cooperating with one of a conical portion of complementary shape carried by said control component and said abutments through axial thrust bearings, movement of the control component beyond the predetermined initial travel causing said enlarged portion, thrust bearings, abutment component, abutments, and sliding ring to move so that the sliding ring disengages the friction ring.

2. The brake actuator according to claim 1, wherein said brake actuator includes a device for resetting to zero formed by a rod including at one end a driving head and at the other end a set of teeth capable of cooperating with a set of teeth formed on the enlarged portion of said nut when a pressure exerted on the driving head is greater than the force exerted by a return spring for the rod.

3. The brake actuator according to claim 1, characterized in that the brake actuator is placed into operation by an actuator piston capable of being subjected to a hydraulic pressure existing in a chamber formed between the body and actuator piston.

4. The brake actuator according to claim 1, wherein the one pair of slots comprises through slots which couple rotatively together the fixed ring and abutment component.

* * * * *